United States Patent [19]

Haufe

[11] Patent Number: 4,907,498

[45] Date of Patent: Mar. 13, 1990

[54] DEVICE FOR ELECTROCLIMATIZATION OF THE INNER CHAMBER OF A MOTOR VEHICLE

[76] Inventor: Paul J. M. Haufe, Sudring 10, 8878 Bibertal-Anhofen, Fed. Rep. of Germany

[21] Appl. No.: 252,367

[22] PCT Filed: Jan. 6, 1988

[86] PCT No.: PCT/EP88/00007

§ 371 Date: Aug. 8, 1988

§ 102(e) Date: Aug. 8, 1988

[87] PCT Pub. No.: WO88/04998

PCT Pub. Date: Jul. 14, 1988

[30] Foreign Application Priority Data

Jan. 8, 1987 [DE] Fed. Rep. of Germany ....... 3700362

[51] Int. Cl.⁴ .............................................. B60H 3/00
[52] U.S. Cl. ...................................... 98/2.11; 361/231
[58] Field of Search ................. 98/2.01, 2.11; 361/230, 361/231, 232

[56] References Cited

U.S. PATENT DOCUMENTS

| 3,292,042 | 12/1966 | Michener et al. | 361/231 X |
| 3,417,302 | 12/1968 | Lueder | 361/231 |
| 3,541,390 | 11/1970 | Jahnke | 361/231 |
| 3,662,217 | 5/1972 | Von Berckheim | 361/231 |
| 3,870,933 | 3/1975 | Huber | 361/231 |
| 3,894,852 | 7/1975 | Von Berckheim | 361/231 X |
| 4,542,434 | 9/1985 | Gehlke et al. | 361/231 |
| 4,740,862 | 4/1988 | Halleck | 361/231 |

FOREIGN PATENT DOCUMENTS

| 8109669 | 4/1981 | Fed. Rep. of Germany . | |
| 2012137 | 3/1970 | France | 361/231 |

Primary Examiner—Harold Joyce
Attorney, Agent, or Firm—Hoffmann & Baron

[57] ABSTRACT

In a device for the electroclimatization of the inner space of a motor vehicle, a first high voltage generator is provided whose output voltage is applied to two substantially oppositely disposed windows of the vehicle chassis. These windows act as electrodes which create an electric field in the inner space of the vehicle. An ion generator powered by a second high voltage generator is mounted in a fresh air conduit of the venting device of the vehicle. The ions which are generated by the ion generator are fed together with the fresh air into the interior of the motor vehicle and are carried therein by the electric field. Seats, steering wheel, safety belts and similar objects which are regularly and permanently contacted by the passengers of the vehicle are connected to ground potential.

18 Claims, 1 Drawing Sheet

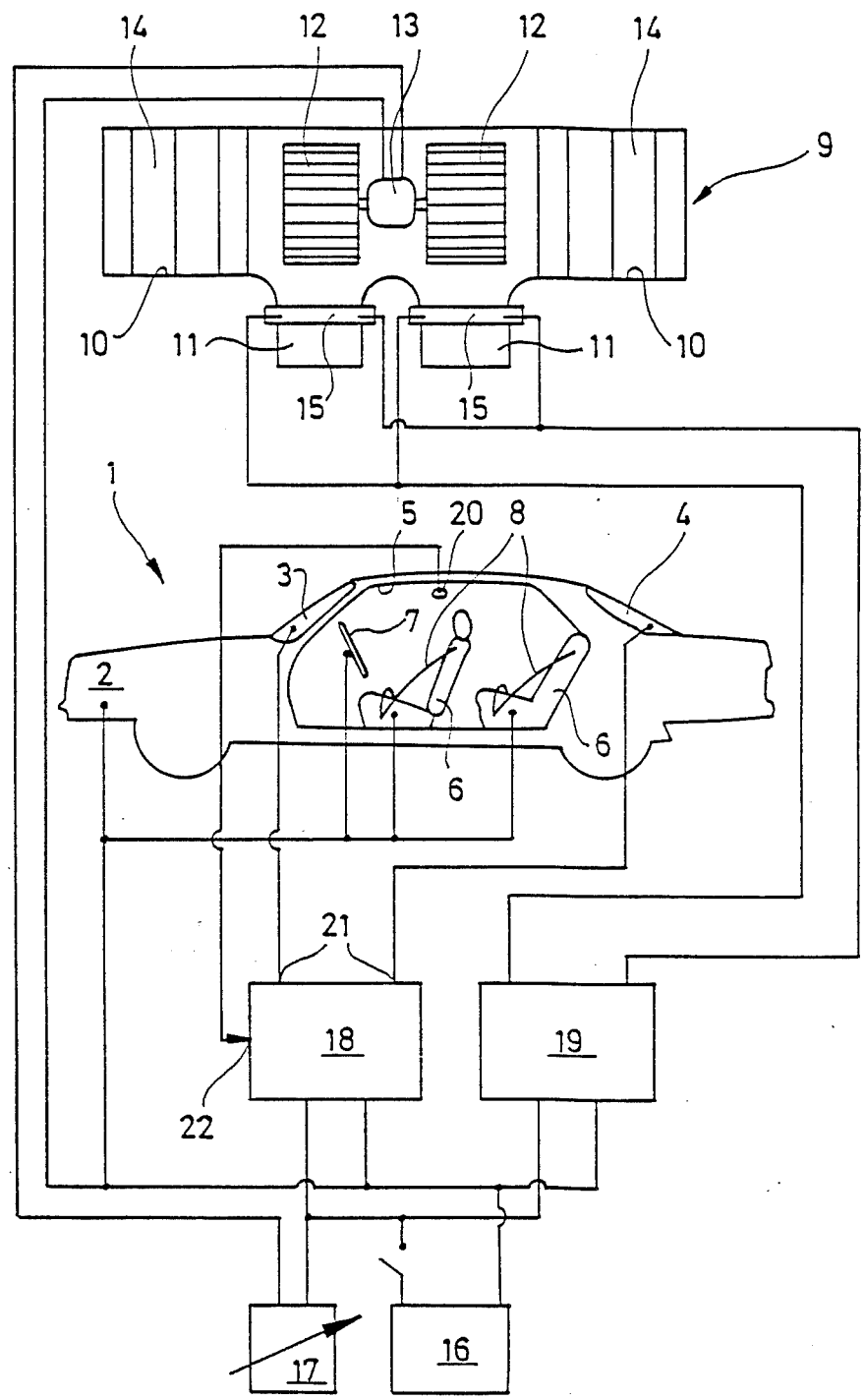

DEVICE FOR ELECTROCLIMATIZATION OF THE INNER CHAMBER OF A MOTOR VEHICLE

BACKGROUND OF THE INVENTION

The invention relates to an assembly for providing electroclimatisation of the interior of a motor vehicle.

The beneficial effects of electrical fields and of ions contained in the ambient air on the health and the well being of persons are very well known. In this context, the book "Biologische Wirkungen von Luftionen", Andras Varga, Verlag für Medizin, Dr. Ewald Fischer, 1986, Heidelberg, is informative. It is also known to simulate in buildings, by means of artificially generated electric fields, such fields which naturally occur in nature and to which the human physiology has adapted. For example, such a device is described in DE-OS 32 29 821.

However, devices for the electroclimatisation for the interiors of motor vehicles have been heretofore unknown. Here, because of the long periods of time which people spend in such motor vehicles and, in view of the fact that the vehicle chassis acts as a Faraday cage causing the nearly complete screening of natural electrical fields, means for providing electroclimatisation are particularly necessary.

SUMMARY OF THE INVENTION

It is an object of the invention to provide a device which simulates electroclimatic conditions in the inner space of a motor vehicle which correspond to the electroclimatic conditions which are required for maintaining the health and the well being of persons therein.

In accordance with this objective, a device is provided which includes a high voltage generator whose output voltage is applied to substantially oppositely disposed windows of the motor vehicle; and means for generating ions within the fresh air conduit of the motor vehicle.

The invention provides electroclimatisation of the inner space of a motor vehicle based upon the combined effects of artificially generated ions which are fed into the inner space of the motor vehicle with the fresh air and an electric field which is maintained therein. The latter has an immediate influence on the health and the well being of the vehicle passengers as well as an effect on the ions being generated by the ion generator, which would have only a small range of travel without this electric field. In accordance with the invention, two substantially oppositely disposed windows are used as electrodes or "antennas" for generating the electric field, whose suitability for this purpose was surprisingly shown during experiments. However, the desired purpose is only fully effective when the passengers of the vehicle are subject to the electric potential of the chassis, i.e., ground potential. For this purpose, in accordance with the invention, at least one object with which the passengers of the vehicle come regularly and permanently into contact is connected to ground. There accordingly are no problems associated with static charging as the flow of ions occurs.

In certain exceptional cases it may be required that the substantially opposite disposed windows be coated with an electrically conductive transparent layer. However, generally the "antenna" or electrode effect is obtained with normal windows.

If the oppositely disposed windows are the front and rear windows, the field lines extend substantially parallel with the longitudinal axis of the car. This is particularly important for the ion feeding if, as normally is the case, the introduction of fresh air occurs mainly on the front transverse side of the vehicle interior or cabin.

In accordance with a further feature of the invention, a sensor is disposed in the inner space of the motor vehicle which measures the strength of the electric field. The sensor generates a representative signal which is fed to the high voltage generator and compared with a nominal value. In the event of a difference between the actual field strength signal and the nominal value, the output voltage of the high voltage generator is readjusted until the desired electrical field strength is obtained in the inner space of the motor vehicle. Such a readjustment for the inner space of buildings is already known form the aforementioned DE-OS 32 29 821. This readjustment is of still greater importance in the inner spaces of motor vehicles where, as already mentioned before, the screening of natural electric fields is more pronounced than in inner spaces of buildings and where the geometric conditions differ greatly from vehicle to vehicle. Therefore, the given type of vehicle does not have to be considered by the manufacturer or when installing the device, and no corresponding adjustment of the voltages has to be performed.

The object with which the passengers of the vehicle come into contact regularly and permanently should be electrically conductive, at least on its outermost layer. This object may, for example, be the steering wheel, a seat, a safety belt or the like.

Either one or two high voltage generators may be provided. If only one is employed, its output voltage is applied to the two windows as well as driving the ion generator. Alternatively, separate generators may be connected to the windows and ion generator, respectively.

A preferred embodiment of the invention is explained in detail in the following in conjunction with the drawing; the single figure schematically illustrates a device for electroclimatisation of the inner space of a motor vehicle.

DETAILED DESCRIPTION OF THE INVENTION

A motor vehicle 1 is schematically illustrated in the center area of the figure. It comprises a chassis 2 which normally provides the ground for the vehicle electrical system. A front window 3 and a rear window 4 are mounted to the chassis 2. Several components with which the passengers of the vehicle come regularly and permanently into contact in the interior 5 of motor vehicle 1 are provided. These are, in particular, the seats 6, the steering wheel 7 and the safety belts 8.

The venting system 9 for the interior 5 of the motor vehicle 1 is schematically illustrated in the upper portion of the figure. It is symmetrically structured for the left and the right halves of the motor vehicle, each half including a fresh air-suction conduit 10, a fresh air-inlet conduit 11 and a radial blower rotor 12 being switchable between conduits 10 and 11. The two radial blower rotors 12 are driven by a common electric motor 13.

Different filter stages 14 are provided in the fresh air-suction conduits 10 of the venting system 9. An ion generator 15 of known construction is inserted in each of the two fresh air inlet conduits 11, and generates in the air flowing therethrough positive and/or negative ions by means of a corona discharge. The ion concentrations which may be generated are discussed in the aforementioned literature reference "Biologische Wirkungen von Luftionen".

The electric circuit, whose components are mainly illustrated in the lower area of the figure, comprises the vehicle battery 16, a regulator 17 for the electric motor 13 which is powered by the battery, a first high voltage generator 18, a second high voltage generator 19, and a sensor being disposed in the interior 5 of the motor vehicle. All components of the electrical circuit are known and need not be described in detail.

The regulator 17 is used in customary fashion for adjusting the speed of the electric motor and thereby the blowers.

The first high voltage generator 18 generates at its high Ohm, shock-proof outputs 21 a direct voltage, whose magnitude between about 1 and 18 kv is controllable in a manner which will be described later. The outputs 21 are electrically connected with two opposing windows 3, 4 see original for missing line are contacted in a conventional manner. If necessary, an electrically conductive, transparent coating may be provided by evaporation on to the windows 3, 4. However, this is usually not necessary.

An electric field is generated in the interior 5 of the motor vehicle 1 when current is applied to the windows 3, 4. The magnitude is monitored by sensor 20. The signal of sensor 20 is fed to a regulating input 22 of the first high voltage generator 18. There the actual value of the electric field measured by sensor 20 is compared with a nominal value which corresponds to the field strength wherein medical testing indicates the greatest beneficial effects on the motor vehicle passengers are obtained. The output voltage of the first high voltage generator 18 is adjusted until the desired field strength is provided.

The output voltage of the second high voltage generator 19 is applied to the two ion generators 15 and provides for the maintaining of a corona discharge. The ions generated are fed with the fresh air into the interior 5 of the motor vehicle 1 and are influenced by the prevailing electric field. Without this electric field, the ions would have only a very small range behind the generators 15. However, under the influence of the electric field, they are fed into substantially the entirety of the interior 5 of the motor vehicle 1, where they can provide their desirable effects upon the passengers of the vehicle.

For maintaining a current flow carried by ions and for prevention of charge (static electricity) effects, it is required that the passengers of the vehicle be connected to ground potential. The seats 6, the steering wheel 7 and the safety belts 8, i.e., the objects which are regularly and permanently contacted by the passengers of the vehicle, are accordingly connected to ground potential. This may be accomplished by providing a conductive coating to these members.

While the invention as described above makes use of two high voltage generators, a system including only one high voltage generator may be employed. The single generator would provide the required voltage not only for generating the electric field but also for driving the ion generators.

What is claimed is:

1. An assembly for electroclimatising the interior space of a motor vehicle comprising:
   a vehicle chassis including at least two windows in substantially opposed relation to each other;
   means connected to said opposing windows for creating an electric field extending between said windows; and
   means for introducing ions into said interior space of said motor vehicle,
   whereby said electric field causes said ions to travel substantially beyond said ion introducing means within said interior space of said motor vehicle.

2. An assembly as defined in claim 1 including means for electrically grounding a passenger within said interior space.

3. An assembly as defined in claim 2 wherein said grounding means is an object with which the passenger of a vehicle is regularly in contact, said object including a conductive outer surface.

4. An assembly as defined in claim 3 wherein said object is a steering wheel.

5. An assembly as defined in claim 3 wherein said object is a seat.

6. An assembly as defined in claim 3 wherein said object is a safety belt.

7. An assembly as defined in claim 1 including a fresh air conduit for introducing fresh air to said interior space of said motor vehicle, said ion introducing means being positioned such that said ions are fed with fresh air from said fresh air conduit into said interior space.

8. An assembly as defined in claim 7 including a blower for moving the air within said fresh air conduit.

9. An assembly as defined in claim 1 including a high voltage generator connected between said two opposed window.

10. An assembly as defined in claim 9 wherein each of said two opposed windows include a coating of electrically conductive, transparent material.

11. An assembly as defined in claim 9 wherein said opposed windows are front and rear windows of said motor vehicle.

12. An assembly as defined in claim 1 wherein said opposed windows are front and rear windows.

13. An assembly as defined in claim 1 wherein said means for introducing ions includes a corona discharge generator.

14. An assembly as defined in claim 13 including a high voltage generator connected to said corona discharge generator.

15. An assembly as defined in claim 1 including means for sensing the actual electric field within said interior space, means for comparing the actual electric field strength with a nominal field strength, and means for adjusting the actual field strength.

16. A method for electroclimatising the interior space of a motor vehicle, comprising:
    providing a vehicle chassis including first and second substantially opposing windows;
    providing a charge to each of said opposing windows, thereby creating an electric field between said opposing windows; and
    introducing ions into said interior space of said motor vehicle, said electric field causing said ions to travel within said interior space.

17. A method as defined in claim 16 including the steps of providing a passenger within said interior space, and connecting said passenger to ground potential.

18. A method as defined in claim 16 including the step of introducing fresh air with said ions into said interior space of said motor vehicle.

* * * * *